Sept. 5, 1950     O. H. GITTER     2,521,004
AUTOMATIC TUBE CUTTING MACHINE
Filed Aug. 24, 1948     3 Sheets-Sheet 1

INVENTOR.
Orville H. Gitter,
BY Morsell & Morsell
ATTORNEYS.

Sept. 5, 1950  O. H. GITTER  2,521,004
AUTOMATIC TUBE CUTTING MACHINE
Filed Aug. 24, 1948  3 Sheets-Sheet 2

INVENTOR.
Orville H. Gitter,
BY Morsell & Morsell
ATTORNEYS.

Sept. 5, 1950             O. H. GITTER             2,521,004
AUTOMATIC TUBE CUTTING MACHINE

INVENTOR.
Orville H. Gitter,
BY Morsell & Morsell
ATTORNEYS

Patented Sept. 5, 1950

2,521,004

UNITED STATES PATENT OFFICE 2,521,004

AUTOMATIC TUBE CUTTING MACHINE

Orville H. Gitter, Appleton, Wis., assignor to Appleton Mfg. Co., Appleton, Wis., a corporation of Wisconsin Application August 24, 1948, Serial No. 45,908

11 Claims. (Cl. 164—56)

This invention relates to improvements in machines for cutting paper tubing, and more particularly to machines of this type which operate automatically. More specifically this invention is an improvement on the machine disclosed in my prior application, Serial No. 703,183, filed October 19, 1946.

A general object of the invention is to provide a paper tube cutting machine adapted for large scale commercial operations, which produces smoothly and evenly severed tubes of a desired length with uniformity of operation.

A further object of the invention is to provide a machine of the class described wherein the various steps in the operation thereof are controlled by an electrical circuit.

A further object of the invention is to provide a machine of the class described wherein the operation of the mandrel jaws and of the cut-off knife are each responsive to the movement of separate hydraulic rams.

A further object of the invention is to provide a machine of the class described having an automatic mechanism for intermittently feeding the uncut tube stock longitudinally along the mandrel.

A further object of the invention is to provide a machine of the class described having a target mechanism mounted adjacent the end of the mandrel thereof, said target mechanism being provided with an electric switch which is actuated by the contact of an uncut tube being fed along the mandrel.

A further object of the invention is to provide a machine of the class described wherein the portion of the target mechanism which is engageable by the paper tube, is swingable out of contact with said tube simultaneously with the severing operation, to permit ejection of the severed portion of the tube from the mandrel.

A further object of the invention is to provide a machine of the class described wherein the tube feeding mechanism is automatically stopped when the supply of uncut tube stock on the mandrel is exhausted.

A further object of the invention is to provide an automatic machine for cutting paper tubes wherein the mandrel shaft clutch mechanism and the tube feeding mechanism are interconnected in a manner to permit operation of the tube feeding mechanism only when the severing knife is out of engagement with the tube stock.

A further object of the invention is to provide a machine of the class described wherein the tube feeding mechanism is automatically reset by the introduction of a new piece of uncut tube stock onto the mandrel thereof.

A further object of the invention is to provide a machine of the class described wherein the reciprocable carrier for the severing knife is provided with a pair of switches which are actuated by movement of said slide, said switches, along with the target mechanism switch, functioning to control the automatic operations of the machine.

A further object of the invention is to provide a machine of the class described wherein the movement of the severing knife into operative position lags behind the movement of the mandrel shaft clutch into engaged positions by reason of a spring loaded sequence valve positioned in the supply line leading to the hydraulic ram which actuates said severing knife, said line originating at a source of fluid pressure which is common to both the severing knife ram and the hydraulic ram which actuates the mandrel shaft clutch.

A further object of the invention is to provide a machine of the class described having a continuously operating hydraulic pump which is connected to the conduits leading to the hydraulic rams thereof through a solenoid operated four-way valve, said solenoid being an integral part of the electrical circuit which controls the operation of the machine.

With these and other objects in view, the invention consists of the improved tube cutting machine and all of its parts and combinations as set forth in the claims, and all equivalents thereof.

In the drawings accompanying and forming a part of this specification wherein is shown one complete embodiment of the preferred form of the invention, and wherein the same reference numerals indicate the same parts in all of the views.

Referring more particularly to the drawing, it will appear that a supporting table or elevated frame for the improved tube cutting machine is indicated generally by the numeral 15. The table 15 has a top 16 formed of longitudinal side members 17 and 18 and preferably has transverse plate members 19 and 20, as well as transverse end members 21 and 22. At the outer end of the top 16 there is a fixed transverse bed 23. Mounted on the top surface of the bed 23, through tongue and groove connections 24, is a cross slide member 25 which is transversely reciprocable relative to the table top 16. Mounted on top of the slide 25, at the far end thereof relative to Figs. 1 and 2 and movable therewith, is an upright standard 26 which is adapted to replaceably hold, in substantially horizontal position, a severing knife or cutter 27.

Figures 2, 6, 7, 8:
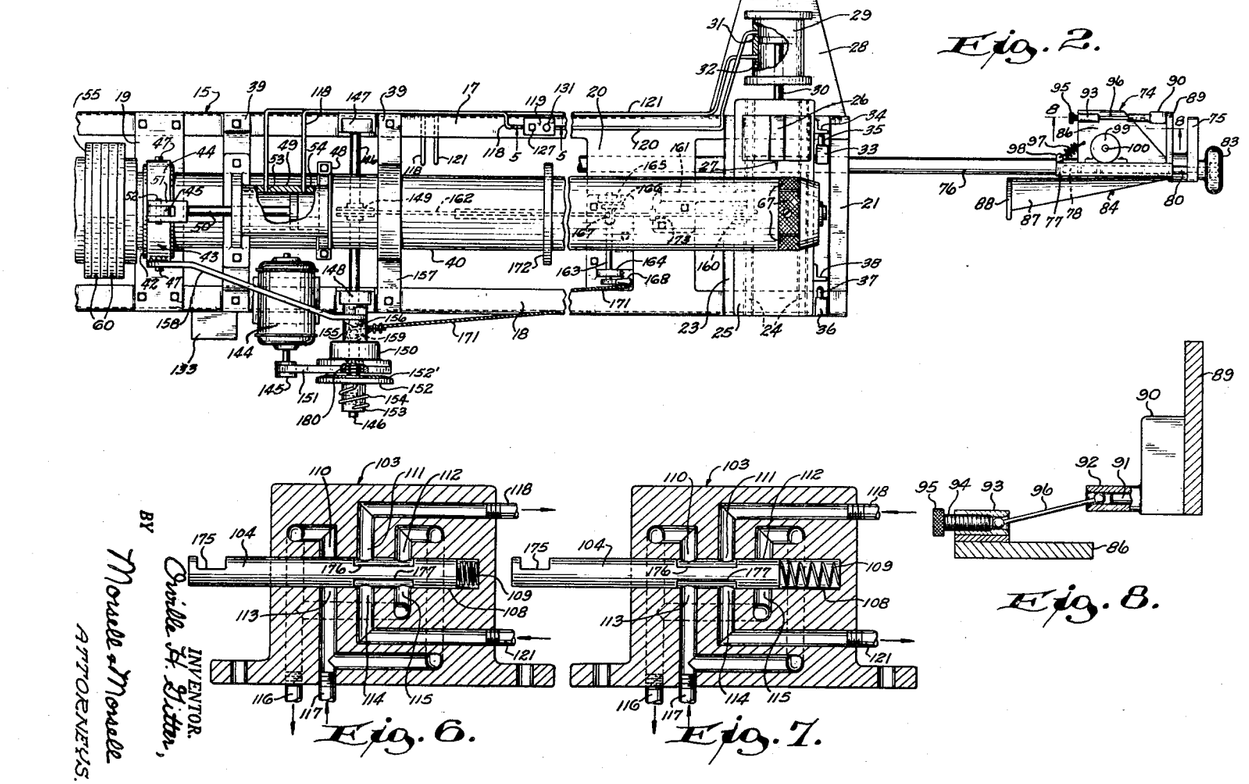
Fig. 2 is a fragmentary plan view of the improved tube cutting machine, parts being broken away and shown in section.
Fig. 6 is an enlarged detail vertical sectional view of the four-way valve showing the plunger thereof in depressed position.
Fig. 7 is a sectional view similar to Fig. 6 only showing the valve plunger in normal position.
Fig. 8 is an enlarged vertical sectional view taken along the line 8—8 of Fig. 2.

The top 16 of the table 15 is provided near its outer end with a rearwardly projecting shelf 28. Mounted on the shelf 28 and operative on a horizontal transverse axis is a double acting hydraulic ram 29. The piston rod 30 of the ram 29 is fixedly connected to the rear end of the slide member 25 as shown in Fig. 2. The ram 29 is provided with a port 31 near the rear end of the casing thereof, and with a port 32 near the front end of the casing thereof.

A normally open electrical push button switch 33 is fixedly mounted on the top face of the bed 23 adjacent the outer edge of the slide member 25 and adjacent the standard 26. An angle bracket 34 is fixed to the outer edge of the slide member 25 and is engageable with the plunger 35 of the switch 33 as shown in Fig. 2.

A normally closed electrical push button switch 36, having a plunger 37, is fixedly mounted on the top face of the bed 23 adjacent the outer edge of the slide member 25 and preferably at the opposite end thereof from the switch 33. An angle bracket 38 is fixedly mounted on the outer edge of the slide 25 and is engageable with the plunger 37 of the switch 36. Forward movement of the cross-slide 25 from the position of Fig. 2 will cause bracket 34 to depress the plunger 35 of the switch 33 thereby closing the contacts of said switch. Further forward movement of the cross-slide will cause the bracket 38 to depress the plunger 37 of the switch 36 to open the contacts thereof. Rearward movement of the slide 25 will permit the plungers of the switches 33 and 36 to return to their normal undepressed positions, thereby restoring the contacts of said switches to normal position.

Mounted on the inner end of the table top 16 are a pair of spaced inverted U-shaped brackets 39 which rigidly support a horizontal tubular mandrel 40.

A mandrel shaft 41 is mounted on suitable bearings and extends axially of the mandrel 40. The shaft 41 projects beyond the inner end of the mandrel 40 as well as slightly beyond the outer end thereof. On roller bearings carried by the shaft 41 adjacent the inner end of the mandrel 40 is an annular collar 42. Pivotally mounted at its lower end on the plate 19 is a yoke 43 (see Fig. 3) having an annular ring portion 44, a short arm 45 projecting vertically upwardly therefrom and a supporting arm 46 projecting downwardly in a diametrically opposite direction from the arm 45. The collar 42 is pivotally connected to the yoke 43 by a pair of bolts 47 which extend horizontally in the same diametrical line.

A U-shaped bracket 48 embraces the exterior of the mandrel 41 between the brackets 39. Fixedly mounted on the top of the left hand bracket 39, as viewed in Figs. 1 and 2, and on the top of the bracket 48 is a double-acting hydraulic ram 49. The ram 49 is mounted with its piston rod 50 projecting parallel with the axis of the mandrel 41 and to the left, as viewed in Figs. 1 and 2. The end of the piston rod 50 is pivotally connected to the upper end of the arm 45 of the yoke 43, as by the forked connection member 51 and the pin 52.

The hydraulic ram 49 is provided with an aperture 53 near the inner end of the casing thereof and is further provided with an aperture 54 near the outer end of said casing. Axial movement of the piston rod of the ram 49 causes pivotal movement of the yoke 43 about the lower end of its arm 46, and this movement causes sliding axial movement of the collar 42 along the shaft 41. As the collar 42 is reciprocated toward the left relative to Figs. 1 and 2, it will abut an an idler pulley 55 which is revolubly mounted on the shaft 41.

Figures 1, 3, 4, 5:
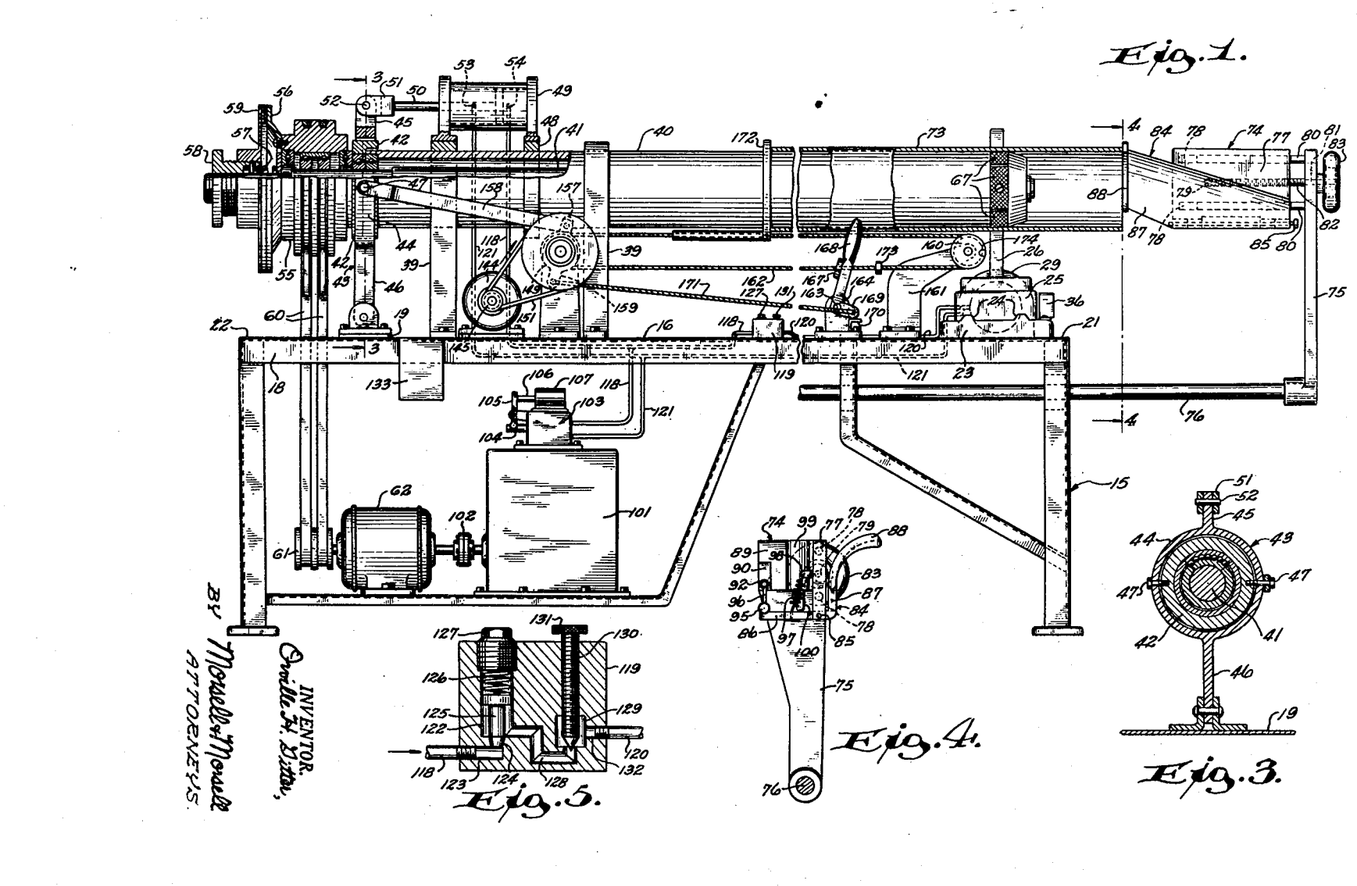
Fig. 1 is a side view of the improved tube cutting machine with an extent of tube stock in position on the mandrel thereof and in engagement with the target, parts being broken away and shown in longitudinal section.
Fig. 3 is a vertical sectional view taken along the line 3—3 of Fig. 1.
Fig. 4 is a view taken along the line 4—4 of Fig. 1.
Fig. 5 is an enlarged detail sectional view of the sequence and needle valve taken along the line 5—5 of Fig. 2.

There is affixed to the inner face of the idler pulley 55 a clutch plate 56, and the initial axial movement of the idler pulley 55 to the left relative to Figs. 1 and 2 causes the clutch plate 56 to compress a coiled spring 57 surrounding an inner end portion of the shaft 41 and bearing against a cap 58 which is fast to the outer end of the shaft 41. This reciprocates the shaft 41 to the left, relative to Figs. 1 and 2, for a purpose later to be described. Further movement of the pulley 55 toward the left on the shaft 41 causes the clutch plate 56 to frictionally engage the adjacent face of a clutch disc 59 which is screwed fast on the shaft 41, causing said shaft to revolve by virtue of endless driving belts 60 which engage the idler pulley 55, and which also engage a pulley 61 on the shaft of a continuously operating electric motor 62.

At the outer end of the shaft 41 there is operatively mounted an expanding jaw assembly (see Figs. 9 and 10) which is retained against outward axial displacement by a snap ring 62 positioned in a circumferential groove 63 in the shaft 41. Mounted on the shaft 41 is an annular wedge member 64 whose sleeve portion at its inner end, has an outer tapered surface 65 to wedgingly engage similarly tapered inner surfaces on the hub portions 66 of jaw segments 67. Keyed to the shaft 41 is the hub of a bushing 68 having an outwardly offset annular portion which extends into the recesses 67' therefor in the jaw segments 67. The jaw segments 67 are radially movably mounted on the offset portion of the bushing 68 by filister head screws 69 fixed to said bushing and having the heads thereof located in enlarged recesses 70 therefor in the jaw segments 67.

Figure 9:
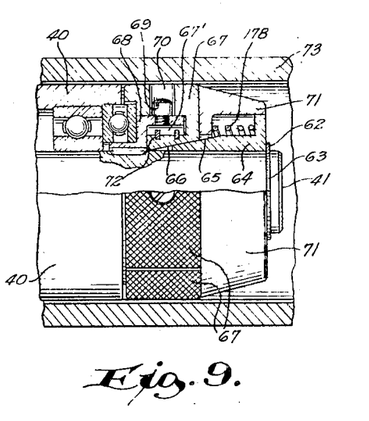
Fig. 9 is an enlarged fragmentary view partly in section showing the construction of the rotatable expanding jaw assembly at the outer end of the mandrel with the jaw segments in retracted position.
Figure 10:
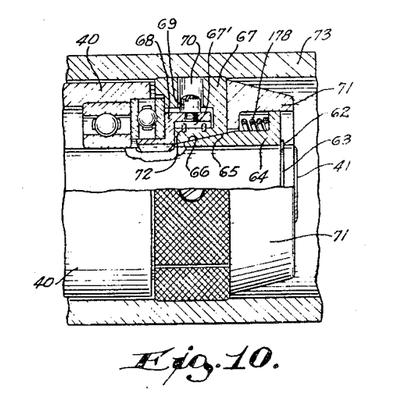
Fig. 10 is a view similar to Fig. 9 only showing the relationship of the component parts when the jaw segments are expanded into engagement with the tube stock.

From the description thus far given of the expanding jaw assembly, it should be obvious that a reciprocation of the shaft 41 to the left relative to Figs. 1 and 2, through the means previously described, is effective to cause movement of the wedge member 64 from its outer normal position of Fig. 9 to its inner jaw expanding position of Fig. 10. In so moving, the wedge member 64 compresses a coiled spring 178 confined in a space between the flanged head of the wedge member 64 and the internal annular flange of a casing member 71, which is in splined association with the wedge member 64. The jaw segments 67 are yieldingly held in their normal retracted positions by encircling band springs 72. When the wedge member 64 is moved inwardly to the position of Fig. 10, it forces the jaw segments 67 radially outwardly so that their outer knurled surfaces project beyond the outer periphery of the mandrel 40 to clampingly engage the inner surface of the elongated cylindrical tube stock 73, which had previously been introduced onto the mandrel 40.

The numeral 74 indicates a target assembly which is carried by an arm 75 mounted fast on the outer end of a shaft 76 journaled for rotation and for longitudinal adjustment in the frame of the table 15. Referring to Figs. 1, 2, 4 and 8, the target assembly 74 consists of a substantially rectangular plate-like frame member 77, which extends substantially in a vertical plane. The member 77 is formed with a pair of spaced unthreaded longitudinally extending apertures 78 and with a central longitudinally extending aperture 79, which is formed with screw threads. A pair of spaced rods 80 project from the inner face of the arm 75 and slidably fit into the apertures 78 of the frame 77, thereby providing a support for said frame which permits longitudinal sliding movement thereof. The arm 75 is formed with an aperture 81 which is alined with the aperture 79 in the frame 77. An adjustment screw 82 is threadedly positioned in the aperture 79 of the frame 77 and has an unthreaded portion of reduced diameter which projects through the aperture 81 of the arm 75. To the outer end of the screw 82 is fixed a knob 83. The construction of the turning screw 82 is such that it cannot move longitudinally. Rotative movement of the screw 82 causes longitudinal movement of the frame member 77.

Referring more particularly to Figs. 1, 2 and 4, the target member 84 is connected to the lower edge of the frame member 77 in a manner to permit both pivotal and limited longitudinal movement of said target member. A fixed pin 85 (see Fig. 1), having an enlarged head, is an integral part of the pivotal mounting above mentioned, and its head portion limits the outward longitudinal movement of the target 84. The target 84 is formed with a flat plate portion 86 which extends rearwardly from the frame 77 in a horizontal plane and is also formed with portion 87, which projects at right angles from the portion 86 and is spaced from the forward face of the frame member 77. The portion 87, at its upper end, is curved away from the frame member 77 as shown in Fig. 4, and in addition, it extends inwardly (to the left) beyond the frame member 77 as shown in Figs. 1 and 2. The target member 87 is provided at its inner end with a substantially crescent-shaped plate member 88, which is adapted to be engaged by the outer end of the tube stock 73, as shown in Fig. 1, to form a stop and a gauge therefor when in the position shown in Figs. 1, 2 and 4.

A substantially rectangular plate member 89 projects rearwardly and at right angles from the outer end of the frame member 77. A normally open electrical push button switch 90 is mounted on the inner face of the frame member 89 near the rear edge thereof. The plunger 91 of the switch 90 is preferably enclosed by a sleeve 92 in the manner shown in Fig. 8. An internally threaded sleeve 93 is fixedly mounted on the frame member 96 near the rear edge thereof and in line with the sleeve 92 of the switch 90 (see Fig. 2). An adjustment screw 94 having a knurled head 95 is mounted in the sleeve 93 as shown in Fig. 8. A link 96 is positioned with one end in the sleeve 93 and in engagement with the end of the screw 94 and with its other end in the sleeve 92 of the switch 90. In Fig. 8 it will be noted that the end of the link 96 in the sleeve 92 is not in contact with the plunger 91 of the switch 90. This relationship exists when the portion 86 of the target 84 is pivoted downwardly and does not correspond to the normal position for these parts shown in Fig. 4. In Fig. 4, the portion 86 of the target 84 is pivoted upwardly to its normal horizontal position. In its normal position, the link 96 more closely approaches a horizontal position, and its end within the sleeve 92 is positioned substantially in contact with the plunger 91 without depressing said plunger. With the link 96 in its normal position, longitudinal outward movement of the target 84 will cause the link 96 to depress the plunger 91 of the switch 90, thereby closing the contacts thereof.

Referring to Figs. 2 and 4, a coiled spring 97 is connected at one end of a lug 98 which projects rearwardly of the frame member 77 adjacent the inner end thereof. The opposite end of the spring 97 is connected to the portion 86 of the target 84 near its inner edge. It will be noted that the coiled spring 97 exerts an inward pull on the target 84 (to the left in Figs. 1, 2 and 8), as well as an upward pull on the portion 86 thereof. A solenoid 99 having a plunger 100 is mounted on the rear face of the frame member 77, with the plunger 100 extending along a vertical axis. When the solenoid 99 is energized, the plunger 100 thereof is forced downwardly against the portion 86 of the target 84, thereby causing counter clockwise pivotal movement of the target 84, as viewed in Fig. 4, against the tension of the spring 97. When the solenoid 99 is not energized, the spring 97 holds the portion 86 of the target 84 in its normal horizontal position.

Referring to Fig. 1, the numeral 101 indicates a continuously operating hydraulic pump and tank unit which is driven by the motor 62 through a coupling 102. The pump in the unit 101 is preferably provided with a suitable pressure relief valve in its discharge line. Mounted on top of the unit 101 is a four-way spring loaded two-position valve 103. The valve 103 has a plunger 104 which is actuated through a pivotal lever 105 by the plunger 106 of a solenoid 107 mounted on top of the valve 103. Energization of the solenoid 107 causes ejection of the plunger 106 therefrom (to the left in Fig. 1), causing counterclockwise pivotal movement of the lever 105, and movement of the plunger 104 to the right as viewed in Figs. 1, 6 and 7.

Referring to Figs. 6 and 7, the valve 103 is formed with a bore 108 in which the plunger 104 is slidably mounted, there being a coil compression spring 109 positioned between the inner end of the plunger 104 and the inner end of the bore 108. Three preferably equally spaced passages 110, 111 and 112 communicate with the bore 108 along the upper surface thereof, and three similarly spaced passages 113, 114 and 115 communicate with the bore 108 at points diametrically opposite from those of the passages 110, 111 and 112 respectively, as shown in Figs. 6 and 7.

The plunger 104 is formed with a recess 175 at its outer end to receive the lower end of the pivotal lever 105. At a point spaced from the inner end of the plunger 104, said plunger is formed with a pair of recesses 176 and 177, which extend inwardly from diametrically opposite side portions thereof, as is shown in Figs. 6 and 7. The recess 176 is of a length to permit communication by said recess with either the passages 110 and 111 or the passages 111 or 112, depending upon the position of the plunger 104. The recess 177 is of the same length, and can communicate with the passages 113 and 114, or 114 and 115, depending upon the position of the plunger 104 as shown in Figs. 6 and 7.

The passages 110 and 115 are interconnected as shown, and communicate with a conduit 116 which leads to the tank or reservoir of the unit 101. The passages 113 and 112 are interconnected, as shown, and communicate with a conduit 117, which leads to the discharge side of the pump in the unit 101. The passage 111 communicates with a conduit 118, which in turn communicates with the aperture 54 of the hydraulic ram 49 and with the inlet to a combination sequence and speed control valve 119. From the outlet of the sequence and speed control valve 119, a conduit 120 leads to the aperture 31 of the hydraulic ram 29. The passage 114 of the valve 103 communicates with a conduit 121, which in turn communicates with the aperture 53 of the hydraulic ram 49, as well as the aperture 32 of the hydraulic ram 29.

The normal position of the plunger 104 of the valve 103 is that shown in Fig. 7. In this position hydraulic fluid under pressure enters the conduit 117, passes up through the passages 113, through the recess 177, through the passage 114 and out through the conduit 121 to the hydraulic rams 49 and 29. Hydraulic fluid returning from the rams 49 and 29 enters the valve 103 through the conduit 118, passes through the passage 111, through the recess 176, through the passage 110, and back to the reservoir, through the conduit 116. When the solenoid 107 is energized, the plunger 104 of the valve 103 is moved to the position of Fig. 6, and in so doing compresses the spring 109. When the plunger 104 is in this position, hydraulic fluid under pressure enters through the conduit 117, passes through the passage 112, through the recess 176, through the passage 111, and out via the conduit 118 to the hydraulic rams 49 and 29. Hydraulic fluid returning from the hydraulic rams 49 and 29 enters the valve 103 through the conduit 121, passes through the passage 114, through the recess 177, through the passage 115 and back to the reservoir through the conduit 116.

Referring to Fig. 5, the combination sequence and speed control valve 119 has a bore 122, which communicates with the conduit 118 through a passage 123 having a bevelled annular seat 124 at one end. Positioned in the bore 122 is a plunger 125 having a frusto-conical lower end which co-operates with the seat 124. The plunger 125 is urged against the seat 124 by a compression spring 126 which is adjustably held within the bore by an adjustment screw 127. One end of a passage 128 communicates with the bore 122 at a point above the seat 124 and the other end thereof communicates with the bottom of a chamber 129. An adjustment screw 130 is threadedly mounted in the body of the valve 119 and has a conical lower end which is positioned in the chamber 129 and which may be adjusted to restrict the opening of the passage 128 into the bottom of said chamber. The adjustment screw is preferably formed with a knurled head 131. A passage 132 communicates with the side wall of the chamber 129 and with the conduit 120.

Figure 11:
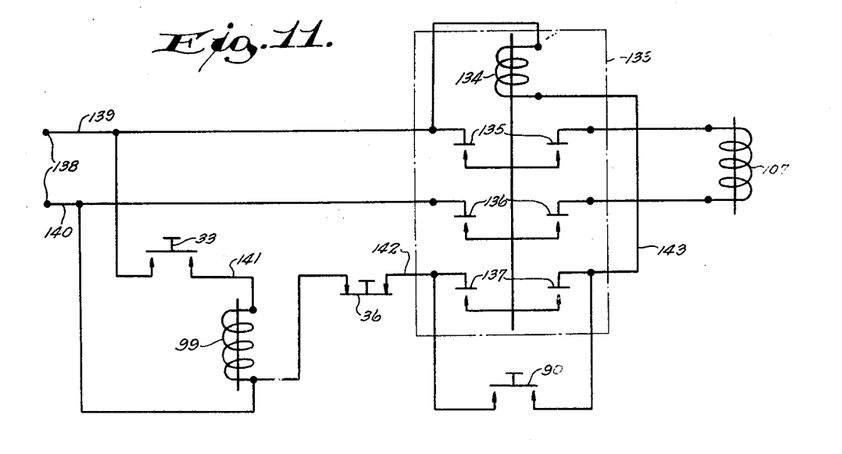
Fig. 11 is a schematic diagram of the electrical circuit which controls the operation of the improved tube cutter.

A normally open, triple-pole, single throw solenoid actuated relay 133 is preferably mounted on the side member 18 of the table 15. Referring more particularly to Fig. 11 wherein is shown a schematic wiring diagram of the electrical circuit which controls the operation of the improved tube cutting machine, it will be noted that the relay 133 has a holding coil 134 and three sets of normally open electrical contacts 135, 136 and 137. Leading from one side of a suitable source of electrical current 138, a line 139 connects with one side of the normally open switch 33, one side of the contacts 135 and one side of the solenoid 134. A line 140 connects from the other side of the source 138 to one side of the contact 136, one side of the solenoid 99 and one side of the normally closed switch 36. A line 141 connects the other side of the switch 33 with the other side of the solenoid 99. A line 142 connects the other side of the switch 36 with one side of contacts 137. A line 143 connects the other side of the holding coil 134 with the other side of the contacts 137, and the solenoid 107 is connected across the other side of the contacts 135 and 136. The normally open switch 98 is connected across the contacts 137.

Referring to Figs. 1 and 2, the numeral 144 indicates a source of continuous variable speed rotatable power such as an electric motor having a pulley 145. A transverse shaft 146 is rotatably journalled, as in bearings 147 and 148, mounted on the members 17 and 18 of the table 15 respectively. A pulley 149 is rigidly mounted on the shaft 146 substantially midway between the bearings 147 and 148. The numeral 150 indicates an idler pulley which is freely rotatable on the shaft 146 and around which extends a driving V-belt 151 which also extends around the pulley 145. The construction of the pulley 150 is such that it engages one side face and the inner face of the V-belt 151. Mounted on the shaft 146 for limited rotatable movement outwardly of the pulley 150 is a disc 152. A hub 153 is rigidly mounted on the shaft 146 outwardly of the disc 152 and the disc 152 is connected to the hub 153 through a torsion spring 154, which is connected at one end to said hub and at the other end to said disc. The deformation of the torsion spring 154 limits the rotation of the disc 152 relative to the hub 153 and the shaft 146. The disc 152 consists substantially of a circular plate having a beveled annular marginal surface 152′, which is adapted to engage the side of the belt 151 opposite the pulley 150. A suitable compression spring 180 is positioned on the shaft 146 between the pulley 150 and the disc 152, and urges said pulley and said disc in opposite directions.

Freely rotatable on the shaft 146 and positioned between the bearing 148 and the pulley 150 is a pair of cam sleeves 155 and 156. The sleeves 155 and 156 have co-operating cam surfaces which, when the sleeves are rotated in opposite directions, cause said sleeves to move apart, thereby forcing the pulley 150 outwardly against the disc 152 while at the same time compressing the spring 180 therebetween. The cam sleeve 156 is provided with an upstanding lug 157, and a link 158 is pivotedly connected at one end to the lug 157 and at the other end to one of the bolts 47 on the yoke 43. The cam sleeve 155 is formed with a downwardly projecting lug 159.

A pulley 160 is revolubly mounted on an arm 161, which in turn is mounted on the plate 20, and an endless cable 162 extends around the pulleys 149 and 160, both the upper and lower extents of the cable 162 being substantially parallel with the axis of the mandrel 40. A transverse shaft 163 is rotatably mounted on suitable bearings, such as 164 and 165. Fixed on the inner end of the shaft 163 adjacent the cable 162 is an upstanding arm 166 having an eye portion 167 through which the lower extent of the cable 162 extends. Rigidly mounted on the shaft 163, preferably outwardly of the bearing 164, is an off-center lever 168. The lever 168 is in the form of a bell crank having an arm 169, which is normally in contact with a suitable stop 170. A cable 171 is connected at one end to the lug 159 of the cam sleeve 155 and is connected at the other end to the arm 169 of the off-center lever 168. Fixidly connected to the upper extent of the cable 162 is a yoke 172 which may have an annular shape and which slidably embraces the mandrel 40. Fixedly connected to the cable 162 is a collar 173. The pulley 160 is formed with a suitable notch 174 to permit the collar 173 to pass therearound with the cable 162.

*Operation*

The operation of the improved tube cutting machine will now be described. With the parts of the machine in their normal position shown in Figs. 1, 2, 4, 7 and 9, the off center lever 168 is moved to the left to cause a slackening of the cable 171. The target 84 is pivoted upwardly sufficiently to permit the introduction of an elongated extent of tube stock 73 onto the mandrel 40 from the outer end thereof. As the tube stock 73 is so introduced, it abuts the yoke 172 which embraces the mandrel 40 and moves said yoke inwardly (to the left in Figs. 1 and 2). Inward movement of the yoke 172 causes simultaneous movement of the upper extent of the cable 162 in the same direction. The target is then allowed to return to its normal position and the target assembly is then adjusted by turning the knob 83 in a direction to space the plate 88 of the target 84 outwardly of the severing knife 27 a distance substantially equal to the length of the sections into which the tube stock 73 is to be cut. Very fine adjustments may be made in the position of the target assembly by turning the knob 83. Where it is desired to materially change the length of tube sections to be cut, the target assembly may be shifted by moving the shaft 76 inwardly or outwardly the desired amount.

To start the automatic operation of the machine, the off-center lever 168 is moved to the right to the position shown in Figs. 1 and 2. This causes a tightening up of the cable 171 and rotates the cam sleeve 155 in a counterclockwise direction as viewed in Fig. 1, while at the same time the cam sleeve 156 is held stationary by the link 158. This relative movement of the cam sleeves results in outward movement of the cam 155 along the shaft 146, pushing the pulley 150 outwardly therewith along said shaft. As the pulley 150 moves outwardly, the constantly moving belt 151 engages the disc 152 along its surface 152′, causing said disc and the shaft 146 to rotate in a clockwise direction as shown in Fig. 1. As the shaft 146 rotates, the pulley 149 also rotates and causes the upper extent of the cable 162 and the yoke 172 to move outwardly (toward the right as viewed in Figs. 1 and 2). As the yoke 172 so moves, it pushes the tube stock 73 in abutment therewith to the right until the outer end of the tube stock 73 engages the plate 88 of the target 84. Engagement of the tube stock 73 with a plate 88 moves the target 84 outwardly into engagement with the head of the fixed hinge pin 85. When the target is thus moved, the link 96 (see Fig. 8) depresses the plunger 91 of the switch 90, thereby closing the contacts of said switch.

Referring to Fig. 11, closing the contacts of the switch 90 causes energization of the holding coil 134 of the relay 133, thereby closing the contacts 135, 136 and 137. Closing of the contacts 135 and 136 causes energization of the solenoid 107 which moves the plunger of the valve 103 to the position shown in Fig. 6. This position of the valve 103 causes hydraulic fluid under pressure to pass out of the passage 111 of the valve 103, through the conduit 118 to the aperture 54 of the hydraulic ram 49 and to the sequence and speed control valve 119. The piston of the ram 49 is immediately moved toward the left as viewed in Figs. 1 and 2, thereby pivoting the yoke 43 to the left to engage the idler pulley 55 and move it to the left. This causes the shaft 41 to be moved to the left and then to be rotated, expanding the jaws 67 prior to said rotation, in the manner previously described to engage the tube stock. Rotation of the expanded jaws 67 causes rotation of the tube stock 73 therewith about the mandrel 40.

As the yoke 43 moves toward the left into clutch engaging position, the link 158 is pulled to the left therewith to permit the sleeve cam 156 to rotate in a counterclockwise direction to allow the sleeve cam 155 to move inwardly along the shaft 146 into the relationship shown in Fig. 2. This permits the pulley 150 to move inwardly along the shaft 146 and disengages the belt 151 from the disc 152, stopping rotation of the shaft 146 and the pulley 149. Stopping of the pulley 149 stops the movement of the cable 162 and the yoke 172 to thereby stop the movement of the stock 73 along the mandrel 40. Any rotation of the disc 152 which takes place between the instant the target 84 is engaged by the tube stock 83 and the movement of the yoke 43 to the left is absorbed by the torsion spring 154 which connects the disc 152 to the hub 153 which is fixed on the shaft 146.

Hydraulic fluid entering the sequence and speed control valve 119 must lift the plunger 125 off the seat 124 against the pressure of the spring 126 before said fluid can flow into the passage 128, past the speed control needle 130 and out the conduit 120. The hydraulic fluid under pressure flows through the conduit 120 to the aperture 31 of the hydraulic ram 29, but because of the spring loaded plunger 125 in the valve 119, there is a momentary lag between the operation of the hydraulic ram 49 and that of the ram 29. This lag results in the tube stock 73 being rotated prior to forward movement of the severing knife 27 into engagement therewith by the ram 29.

As the cross slide 25 is moved forward by the hydraulic ram 29, the angle bracket 34 on the side of said slide depresses the plunger 35 of the switch 33, thereby closing the contacts thereof. Referring again to Fig. 11, energization of the solenoid 99 of the target assembly 74 is effected, and the plunger 100 pivots the target 84 about the hinge pin 85, in a counterclockwise direction as viewed in Fig. 4, against the tension of the spring 97. This pivotal movement is relatively short, but it is sufficient to move the plate 88 of the target 84 upwardly out of contact with the outer end of the tube stock 73 to permit the severed section thereof to pass past the plate 88 of the target 84.

As the cross slide 25 continues to move forward, it effects cut-off of a section of tubing, and in addition, the bracket 38 depresses the plunger 37 of the switch 36 to open the contacts thereof. This de-energizes the holding coil 134 (see Fig. 11) and opens the contacts 135, 136 and 137, thereby de-energizing the solenoid 107 and allowing the spring 109 in the valve 103 to move the plunger 104 thereof to its normal position shown in Fig. 7. When the valve 103 is in the position of Fig. 7, hydraulic fluid passes through the conduit 121 to the aperture 53 of the ram 49 and to the aperture 32 of the ram 29. This causes movement of the yoke 43 to the right and also causes rearward movement of the cross slide 25. Return of the cross slide 25 to its normal position opens the contacts of the switch 33 thereby deenergizing the solenoid 99 of the target assembly 74. Deenergization of the solenoid 99 permits the spring 97 to pull the target 84 both longitudinally inwardly (to the left in Fig. 2) and in a clockwise direction (as viewed in Fig. 4) to thereby return it to its normal position wherein the plate 88 thereof will again be in the path of the tube stock 73 as it is fed outwardly along the mandrel during the next cycle of operation. Return of the cross slide 25 also closes the contacts of switch 36.

As the yoke 43 moves to the right the expanding jaws 67 disengage the tube stock 73 and then the shaft 41 stops rotating. Movement of the yoke 43 to the right also causes movement of the link 158 to the right, thereby causing the cam 156 to rotate in a clockwise direction as viewed in Figs. 1 and 2. Since the cam 155 is held against clockwise movement beyond the limits permitted by the cable 171 connected thereto, movement of the yoke 43 to the right causes a rotational movement of the cam 156 relative to the cam 155 which results in movement of the cam 155 outwardly along the shaft 146. As the cam 155 again so moves, it pushes the pulley 150 outwardly and engages the constantly moving belt 151 with the disc 152, causing it and the shaft 146 to rotate. As previously described, rotation of the shaft 146 causes the yoke 172 to push the tube stock outwardly along the mandrel toward the target 84, thereby starting a new cycle.

As the tube stock 73 is cut into a plurality of sections of predetermined length by a series of the cut-off cycles like the one hereinbefore described, the yoke 172 approaches the outer end of the mandrel 40, and the collar 173 which is fixed on the cable 162, approaches the eye 167 of the arm 166 on the transverse shaft 163. At a predetermined point in this movement of the cable 162 the collar 173 engages the eye 167 and moves it to the left as viewed in Figs. 1 and 2. This rotates the shaft 163 in a counterclockwise direction as viewed in Fig. 1 and swings the off-center lever 168 to the left, thereby releasing the tension on the cable 171. As long as the cable 171 is slack, there can be no relative movement of the cams 155 and 156, and consequently there will be no outward movement of the yoke 172. While the coaction of the collar 173 and the eye 167 stops all feeding action by the yoke 172 at the outer limit of its travel, it is apparent that the feeding of the tube stock 73 along the mandrel 40 may be stopped by the operator at any time by manually moving the lever 168 to the left and thereby slackening the cable 171.

The degree to which the operation of the hydraulic ram 29 lags behind that of the ram 49 during a cut-off cycle may be varied by adjusting the screw 127 of the valve 119 to vary spring load on the plunger 125 thereof. The speed with which the ram 29 moves can also be easily adjusted by means of the speed controlling screw 131 of the valve 119, which controls the rate of flow of hydraulic fluid to the ram 29 through the conduit 120.

Various changes and modifications may be made without departing from the spirit of the invention and all of such changes are contemplated as may come within the scope of the claims.

What is claimed as the invention is:

1. In a tube cutting machine, a tubular stock supporting mandrel, a shaft extending axially through said mandrel, said shaft being reciprocable and rotatable relative to the mandrel, means on said shaft responsive to reciprocatory movement of the shaft for clamping the stock, a source of rotative power, means including a hydraulic ram for causing reciprocatory movement of said shaft and for causing rotation of said shaft by said source of rotative power, and a cutter movable into and out of stock rotated on said mandrel.

2. In a tube cutting machine, a tubular stock supporting mandrel, a shaft extending axially through said mandrel, said shaft being reciprocable and rotatable relative to the mandrel, means on said shaft responsive to reciprocatory movement of the shaft for clamping the stock, a source of rotative power, means including a hydraulic ram for causing reciprocatory movement of said shaft and for causing rotation of said shaft by said source of rotative power, a cutter movable into and out of stock rotated on said mandrel, a second hydraulic ram for operating said cutter, and fluid pressure and return conduits connected to said hydraulic rams.

3. In a tube cutting machine, a tubular stock supporting mandrel, a shaft extending axially through said mandrel, said shaft being reciprocable and rotatable relative to the mandrel, means on said shaft responsive to reciprocatory movement of the shaft for clamping the stock, a source of rotative power, a clutch mounted on said shaft and having a rotating member driven by said source of power, an hydraulic ram for actuating said clutch to cause reciprocatory movement of said shaft and to cause rotation of said shaft with said rotating clutch member, and a cutter movable into and out of stock rotated on said mandrel.

4. In a tube cutting machine, a tubular stock supporting mandrel, a shaft extending axially through said mandrel, said shaft being reciprocable and rotatable relative to the mandrel, means on said shaft responsive to reciprocatory movement of the shaft for clamping the stock, a source of rotative power, a clutch mounted on said shaft and having a rotating member driven by said source of power, an hydraulic ram for actuating said clutch to cause reciprocatory movement of said shaft and to cause rotation of said shaft with said rotating clutch member, a cutter movable into and out of stock rotated on said mandrel, a second hydraulic ram for operating said cutter, and fluid pressure and return conduits connected to said hydraulic rams.

5. In a tube cutting machine, a tubular stock supporting mandrel, a shaft extending axially through said mandrel, said shaft being reciprocable and rotatable relative to the mandrel, stock clamping jaws carried by the shaft and actuated by reciprocation thereof, a clutch mounted on said shaft and having a freely rotatable member, means for rotating said rotatable clutch member, means for engaging said clutch to cause rotation of said shaft, operation of said clutch engaging means being also effective to reciprocate said shaft, means for mechanically moving stock along said mandrel, and interlocking means for rendering said stock moving means inoperative when said clutch is engaged.

6. In a tube cutting machine, a tubular stock supporting mandrel, a shaft extending axially through said mandrel, said shaft being reciprocable and rotatable relative to the mandrel, stock clamping jaws carried by the shaft and actuated by reciprocation thereof, a clutch mounted on said shaft and having a freely rotatable member, means for rotating said rotatable clutch member, means for engaging said clutch to cause rotation of said shaft, operation of said clutch engaging means being also operative to reciprocate said shaft, a pusher member adjacent the mandrel for moving stock therealong, and interlocking means for stopping said pusher member at a predetermined point.

7. In a tube cutting machine, a tubular stock supporting mandrel, a shaft extending axially through said mandrel, the shaft being reciprocable and rotatable relative to the mandrel, a clutch mounted on said shaft and having a freely rotatable member, means for rotating said freely rotatable member, stock clamping jaws carried by the shaft, means for actuating said jaws and said clutch, a cutter movable into and out of stock rotated with said clamping jaws, a stock moving member mounted adjacent said mandrel for movement longitudinally thereof, drive means extending to said member, a second clutch for controlling said member drive means, and means interlocking both of said clutches to normally engage said second clutch upon disengagement of said first clutch.

8. In a tube cutting machine, a tubular stock supporting mandrel, a shaft extending axially through said mandrel, the shaft being reciprocable and rotatable relative to the mandrel, a clutch mounted on said shaft and having a freely rotatable member, means for rotating said freely rotatable member, stock clamping jaws carried by the shaft, means for actuating said jaws and said clutch, a cutter movable into and out of stock rotated with said clamping jaws, a stock moving member mounted adjacent said mandrel for movement longitudinally thereof, drive means extending to said member, a second clutch for controlling said member drive means, means interlocking both of said clutches to normally engage said second clutch upon disengagement of said first clutch, and means connected to said second clutch for selectively preventing engagement thereof.

9. In a tube cutting machine, a tubular stock supporting mandrel, a shaft extending axially through said mandrel, the shaft being reciprocable and rotatable relative to the mandrel, a clutch mounted on said shaft and having a freely rotatable member, means for rotating said freely rotatable member, stock clamping jaws carried by the shaft, means for actuating said jaws and said clutch, a cutter movable into and out of stock rotated with said clamping jaws, a stock moving member mounted adjacent said mandrel for movement longitudinally thereof, drive means extending to said member, a second clutch for controlling said member drive means, means interlocking both of said clutches to normally engage said second clutch upon disengagement of said first clutch, a lever connected to said second clutch for selectively preventing engagement thereof, and means for actuating said lever upon movement of said stock moving member to a predetermined point in its travel to thereby render said second clutch unengageable.

10. In a tube cutting machine, a mandrel for supporting an elongated extent of tubing stock from which individual tubes of predetermined length are to be cut, a target assembly spacedly and adjustably mounted adjacent the outer end of the mandrel, means for moving the stock along the mandrel toward said target assembly, said target assembly carrying a pivotal target which is normally positioned in the path of the stock as said stock is moved along the mandrel, said target assembly also having a solenoid for pivotally moving said target out of the path of the stock, a cross slide movable laterally of the mandrel and carrying a cutter, means for moving the cross slide back and forth to move the cutter into and out of the rotating stock, an electrical switch actuated by inward movement of said cross slide, and an electrical circuit including said cross slide switch for controlling the operation of said stock moving means, said stock rotating means and said cross slide moving means, said circuit functioning upon actuation of said cross slide switch to energize said solenoid to thereby swing the target out of the path of the tube stock on the mandrel.

11. In a tube cutting machine, a mandrel for supporting an elongated extent of tubing stock from which individual tubes of a predetermined length are to be cut, a target assembly spacedly and adjustably mounted adjacent the outer end of the mandrel, means for moving the stock along the mandrel toward said target assembly, said target assembly carrying a pivotal and longitudinally movable target which is normally positioned in the path of the stock as said stock is moved along the mandrel, said target assembly having an electrical switch which is actuated by longitudinal movement of said target, and said target assembly also having a solenoid for pivoting said target out of the path of the stock, means for rotating the stock, a cross slide movable laterally of the mandrel and carrying a cutter, means for moving the cross slide back and forth to move the cutter into and out of the rotating stock, an electrical switch actuated by inward movement of the cross slide, and an electrical circuit including said target assembly switch and said cross slide switch for controlling the operation of said stock moving means, said stock rotating means and said cross slide moving means, said electrical circuit functioning upon actuation of the target assembly switch to stop the stock moving means, and said circuit also functioning upon actuation of the cross slide switch to energize said solenoid to thereby swing the target out of the path of the tube stock.

ORVILLE H. GITTER.

REFERENCES CITED

The following references are of record in the file of this patent:

UNITED STATES PATENTS

| Number | Name | Date |
|---|---|---|
| 1,020,433 | McGrath | Mar. 19, 1912 |
| 1,782,692 | Lawson | Nov. 25, 1930 |
| 1,972,595 | Libby | Sept. 4, 1934 |

FOREIGN PATENTS

| Number | Country | Date |
|---|---|---|
| 452,317 | Great Britain | Aug. 20, 1936 |